United States Patent
Olson et al.

(10) Patent No.: US 9,501,938 B1
(45) Date of Patent: *Nov. 22, 2016

(54) SURFACE INFORMATION GENERATING SYSTEM, DEVICE, AND METHOD

(71) Applicant: ROCKWELL COLLINS, INC., Cedar Rapids, IA (US)

(72) Inventors: Ryan J. Olson, Marion, IA (US); Scott E. Schultz, Cedar Rapids, IA (US); Max G. Taylor, Hiawatha, IA (US); Peter J. Flugstad, Marion, IA (US); Shawn M. Spencer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 301 days.

This patent is subject to a terminal disclaimer.

(21) Appl. No.: 14/191,579

(22) Filed: Feb. 27, 2014

(51) Int. Cl.
| | |
|---|---|
| *G06T 11/60* | (2006.01) |
| *G01C 21/00* | (2006.01) |
| *G01C 23/00* | (2006.01) |
| *G08G 5/00* | (2006.01) |

(52) U.S. Cl.
CPC ............ *G08G 5/0047* (2013.01); *G06T 11/60* (2013.01)

(58) Field of Classification Search
CPC combination set(s) only.
See application file for complete search history.

(56) References Cited

U.S. PATENT DOCUMENTS

| | | | |
|---|---|---|---|
| 6,433,729 B1 * | 8/2002 | Staggs ..................... | G01S 7/12 342/179 |
| 7,714,744 B1 | 5/2010 | Wichgers | |
| 8,094,188 B1 * | 1/2012 | Yum .................... | G01C 23/005 340/974 |
| 8,099,234 B1 * | 1/2012 | Frank ................... | G01C 23/005 701/436 |
| 8,234,020 B1 | 7/2012 | Wichgers et al. | |
| 8,264,498 B1 * | 9/2012 | VanDerKamp ...... | G01C 21/005 340/980 |
| 8,718,915 B1 * | 5/2014 | Turcios ................ | G01C 23/005 342/176 |
| 8,744,760 B1 * | 6/2014 | Mishmash .......... | G01C 23/005 701/454 |
| 9,243,910 B1 * | 1/2016 | Esno ..................... | G01C 21/00 |

* cited by examiner

*Primary Examiner* — Wesner Sajous
(74) *Attorney, Agent, or Firm* — Daniel M. Barbieri; Donna P. Suchy; Angel N. Gerdzhikov

(57) ABSTRACT

A present novel and non-trivial system, device, and method for generating surface information presentable on a display unit is disclosed, where the surface information may be presented to draw a viewer's attention to the presence of threatening object(s). An image generator ("IG") may be configured to receive navigation data; retrieve object data representative of vertical measurements of objects; and generate an image data set representative of an image comprised of object highlighting band(s) capable of highlighting object(s) which meet object highlighting band criteria, where such criteria could include an object reference. In one embodiment, the object highlighting band could be horizontally-disposed, where the object reference may be a horizontal measurement referenced to aircraft position to which the retrieval of the object data may be limited. In another embodiment, an object highlighting band could be vertically-disposed, where the object reference may be a vertical measurement referenced to aircraft position.

20 Claims, 10 Drawing Sheets

SURFACE INFORMATION GENERATING SYSTEM, DEVICE, AND METHOD

BACKGROUND OF THE INVENTION

Field of the Invention

This invention pertains generally to the field of display systems such as, but not limited to, aircraft display systems.

Description of the Related Art

Synthetic vision systems are becoming more popular in the aviation industry. Typically, each system generates a synthetic image of three-dimensional perspective of a scene located outside the aircraft. When these synthetic images are presented to the pilot, he or she is provided with a visually realistic scene of the three-dimensional scene that is actually being viewed by him or her when looking outside. As such three-dimensional synthetic scenes are begin presented, pilots flying in relatively close proximity to the surface may have difficulty determining present vertical elevation and may experience a loss of depth perception relative to surrounding terrain and environment.

Typical pilotage vertical indicator symbology presented of a tactical display unit such as a primary flight display ("PFD") may provide an indication of instant altitude or instant radio altitude of a point directly above the surface; however, such symbology may not be useful in determining height at other locations in the scene and other phases of flight including, but not limited to, takeoff, climb-out, enroute, approach, hover, and land. If a momentary loss of situational awareness is experienced, threatening terrain and/or obstacles that are not measured or presented by typical pilotage vertical indicator symbology may go unnoticed.

BRIEF SUMMARY OF THE INVENTION

A present novel and non-trivial system, device, and method for generating surface information presentable on a display unit are disclosed. With the embodiments disclosed herein, a pilot may be advised of the presence of threatening objects such as terrain and/or obstacles by viewing three-dimensional object highlighting bands on the display unit as he or she travels over the surface.

In one embodiment, a system is disclosed for generating surface information presentable on a display unit. The system may be comprised of a source of navigation data, a source of object data, and an image generator ("IG"). The source of navigation data could be configured to provide data representative of at least aircraft position and heading, and the source of object data could be configured to provide object data representative of vertical measurements and/or locations of objects. In an additional embodiment, the system could also be comprised of one or more display units configured to present an image represented in an image data set.

In another embodiment, a device is disclosed for generating surface information presentable on a display unit. The device may be comprised of the IG configured to perform the method disclosed in the following paragraph.

In another embodiment, a method is disclosed for generating surface information presentable on a display unit. The method may be comprised of receiving navigation data; retrieving object data corresponding to the navigation data; and generating an image data set based upon object data, where the image data set is representative of an image comprised of one or more object highlighting bands capable of highlighting one or more objects meeting object highlighting band criteria. In one embodiment, an object highlighting band could be horizontally-disposed, the object highlighting band criteria could include an object reference comprised of a horizontal measurement of distance or time referenced to aircraft position to which the retrieval of the object data is limited. In another embodiment, an object highlighting band could be vertically-disposed, and the object highlighting band criteria could include an object reference comprised of a vertical measurement referenced to aircraft position.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
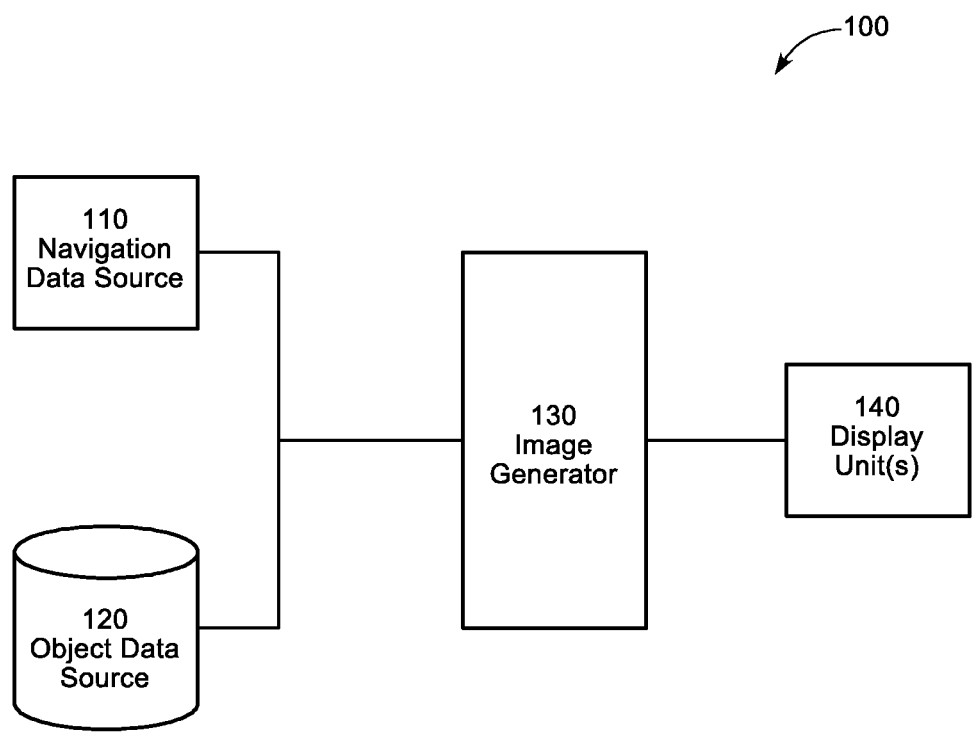
FIG. 1 depicts a block diagram of a system for generating an image of surface information presentable on a display unit.

FIG. 1 depicts a block diagram of a surface information generating and/or presenting system 100 suitable for implementation of the techniques described herein. The generating and/or presenting system 100 of an embodiment of FIG. 1 includes a navigation data source 110, an object data source 120, an image generator ("IG") 130, and a display unit(s) 140.

In the embodiment of FIG. 1, the navigation data source 110 could be comprised of a system or systems that may provide navigation data information in an aircraft. The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, and attitude. As embodied herein, aircraft position may be comprised of geographic position (e.g., latitude and longitude coordinates) and altitude, and ground track may be derived from either geographic position, aircraft position, or both; aircraft orientation may be comprised of pitch, roll, and/or yaw information related to the attitude of the aircraft. As embodied herein, the navigation data source 110 could be configured to provide navigation data to the IG 130 for subsequent processing as discussed herein.

In an embodiment of FIG. 1 the navigation data source 110 could be further comprised of a flight management system ("FMS") which could perform a variety of functions performed to help the crew in the management of the flight; these functions are known to those skilled in the art. These functions could include receiving a flight plan (or planned flight route) and constructing a lateral and vertical flight plan from the flight plan. The flight plan could be comprised of a series of waypoints, where each waypoint could include an altitude constraint associated with it. A pilot could create a flight plan by entering waypoints stored in a database or select a flight plan stored in a database of the FMS; also, the flight plan could be received and loaded into the FMS automatically through a datalink system comprised of any system(s) and/or device(s) configured to facilitate a wireless, two-way communication of data to and from sources external to the aircraft including, but not limited to, ground stations and satellites.

It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. Additionally, aircraft could be watercraft capable of operating on or beneath water.

In the embodiment of FIG. 1, the object data source 120 could be comprised of any source of object data such as, but not limited to, data representative of elevations and/or locations of terrain, obstacles, other manmade or natural features, geopolitical boundaries, defined airspace, hazard weather regions, or any combination thereof. As embodied herein, the object data source 120 could be configured to provide object data to the IG 130 for subsequent processing as discussed herein.

As embodied herein, the object data source 120 may include, but is not limited to, a terrain database and other aircraft systems which could employ object data. The terrain database may be any database used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a cell defined in arc-seconds of latitude and longitude, or a grid may be rectangular, square, hexagonal, or circular. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set. Resolutions of one-arc second for SRTM terrain data have been available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

The object data source 120 may be comprised of an airport database comprised of one or more airport mapping databases configured to store, in part, data representative of an elevation and location of an airport or aerodrome reference point and dimensions and locations of surface features such as, but not limited to, runways, helipads, taxiways, frequency areas, aprons, parking areas, and vertical structures located within an area defined as an airport and/or aerodrome. One such example of such airport database is described in industry standards published by Aeronautical Radio, Inc. ("ARINC") and/or Radio Technical Commission for Aeronautics ("RTCA") such as, but not limited to, ARINC Specification 816 entitled "Embedded Interchange Format for Airport Mapping Database" and RTCA DO-272A entitled "User Requirements for Aerodrome Mapping Information." With the use of the ARINC 816 airport database, objects comprised of surface features may be presented to the viewer.

It should be noted that data contained in any database discussed herein including the terrain database may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle and/or temporary flight restriction could be stored in the terrain database.

Any database disclosed herein may be a stand-alone database or a combination of databases. For example, the terrain database may be associated with a terrain awareness and warning system ("TAWS") only. In an alternative embodiment, the terrain data could be stored in or combined with an airport database, airspace database, or with a database used by any other aircraft system including, but not limited to, a database associated with the FMS and an airspace awareness and warning system ("AAWS"). An example of a TAWS has been disclosed by Wichgers et al in U.S. Pat. No. 8,234,020 entitled "System and Methods for Generating Alert Signals in a Terrain Awareness and Warning System," which is incorporated by reference herein in its entirety. An example of an AAWS which utilizes airport and airspace databases has been disclosed by Wichgers in U.S. Pat. No. 7,714,744 entitled "System and Methods for Generating Alert Signals in an Airspace Awareness and Warning System," which is incorporated by reference herein in its entirety.

In an embodiment of FIG. 1, the IG 130 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG 130 may be programmed or configured to drive the execution of software or source code containing algorithms developed for the specific functions embodied herein. As embodied herein, the terms "programmed" and "configured" are synonymous with respect to the execution of software or source code developed for the specific functions and methods embodied herein. The IG 130 may be electronically coupled to systems and/or sources of data to facilitate the receipt of data; as embodied herein, operatively coupled may be considered as interchangeable with electronically coupled. It is not necessary that a direct connection be made; instead, such receipt of input data and the providing of output data could be provided through a data bus or through a wireless network.

Common examples of electronic data processing units are microprocessors, Digital Signal Processors (DSPs), Programmable Logic Devices (PLDs), Programmable Gate Arrays (PGAs), Application-Specific Integrated Circuits (ASICs), and signal generators; however, for the embodiments herein, the term "processor" is not limited to such processing units and its meaning is not intended to be construed narrowly. For instance, a processor could also consist of more than one electronic data processing unit. As embodied herein, the IG 130 could be a processor(s) used by or in conjunction with any other system of the aircraft including, but not limited to, a processor(s) associated with a vision system such as a synthetic vision system ("SVS"), an enhanced vision system ("EVS"), a combined SVS-EVS, an FMS, a TAWS, and an AAWS, or any combination thereof.

In an embodiment of FIG. 1, the display unit(s) 140 could be comprised of any display unit or units that provide symbology of tactical flight information and/or strategic flight information such as a tactical display unit and/or a strategic display unit, respectively. Although the following discussion is drawn toward display units physically installed in an aircraft, the embodiments disclosed herein may be applied to portable electronic devices configured with displays (e.g., laptop computers, electronic flight bags, handheld device, touch screen device, notebook, tablet, user-wearable device, etc. . . . ). As embodied herein, the display unit(s) 140 could include a vision system (not shown in FIG. 1) which generates an image data set which represents the image displayed on a display unit(s). Vision systems include, but are not limited to, an SVS, an EVS, and/or a combined SVS-EVS.

The tactical display unit could be comprised of any unit that presents tactical information relative to the instantaneous or immediate control of the aircraft, whether the aircraft is in flight or on the ground. The tactical display unit could be comprised of a Head-Down Display ("HDD") unit and/or a Head-Up Display ("HUD") unit. The HDD unit is typically a unit mounted to an aircraft's flight instrument panel located in front of a pilot and below the windshield and the pilot's field of vision, and the HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot.

The tactical display unit could display the same information found on a primary flight display ("PFD"), such as "basic T" information (i.e., airspeed, attitude, altitude, and heading). Although it may provide the same information as that of a PFD, the tactical display unit may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The tactical display unit is designed to provide flexible configurations which may be tailored to the desired configuration specified by a buyer or user of the aircraft.

The strategic display unit could be any unit which presents strategic information to the crew relative to the intended future state(s) of the aircraft (e.g. intended location in space at specified times) along with information providing contextual information to the crew (e.g. terrain, navigation aids, geopolitical boundaries, airspace boundaries, runway traffic and/or incursion information, etc.) about such state(s). One example of such display unit is commonly referred to as a Navigation Display. In some configurations, the strategic display unit could be part of an Electronic Flight Information System ("EFIS").

Figure 2A:
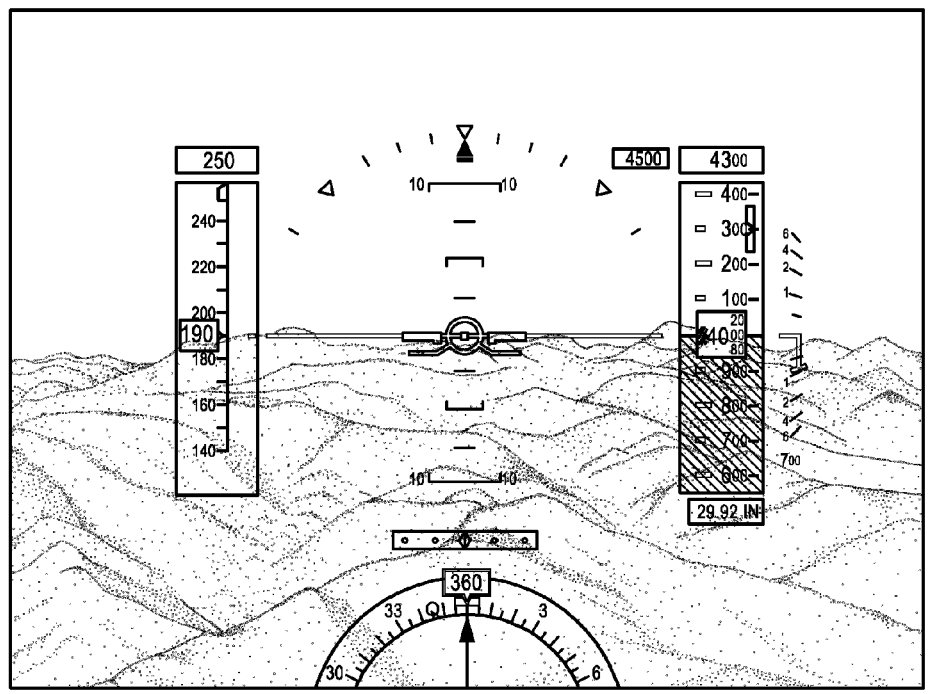
FIG. 2A presents an exemplary illustration of a Head-Down Display ("HDD") unit.
Figure 2B:
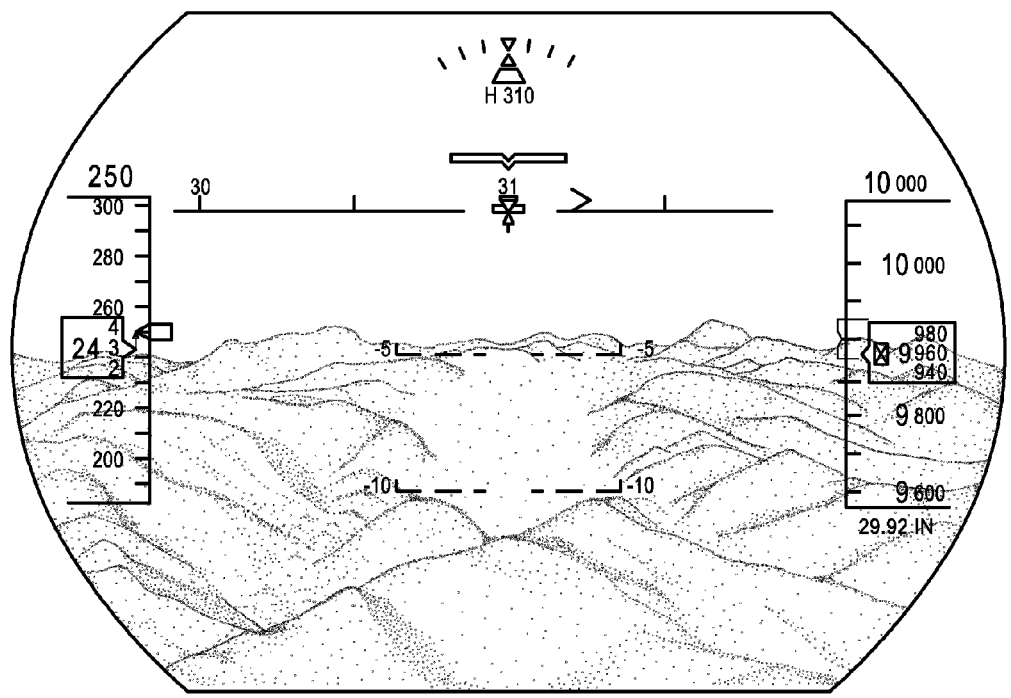
FIG. 2B presents an exemplary illustration of a Head-Up Display ("HUD") unit.

FIG. 2A provides an exemplary depiction of an HDD unit for presenting tactical information to the pilot or flight crew against the background of a three-dimensional image of terrain and sky. FIG. 2B provides an exemplary depiction of a HUD unit for presenting tactical information to the pilot or flight crew against the background of a three-dimensional image of terrain and sky. Both the HDD unit and HUD unit could be employed as display units configured to present SVS image(s), EVS image(s), or combined SVS-EVS image(s). It should be noted that the tactical information depicted on the HDD unit and/or HUD unit has been made minimal for the sake of presentation and is not indicative of the plurality of indications or information with which it may be configured. Because the indications or information shown in FIGS. 2A and 2B are well-known to those skilled in the art, a discussion of the specific tactical information shown on them is not provided herein.

Both the HDD unit and/or the HUD unit may be designed to provide flexible configurations which may be tailored to the desired configuration specified by a buyer or user of the aircraft. As disclosed below, aircraft positioned-based objects—that is, objects defined by their relative location to an aircraft—may be highlighted in a three-dimensional synthetic and/or enhanced image of objects (e.g., terrain, obstacles, etc. . . . ) using location highlighters.

Figure 3A:
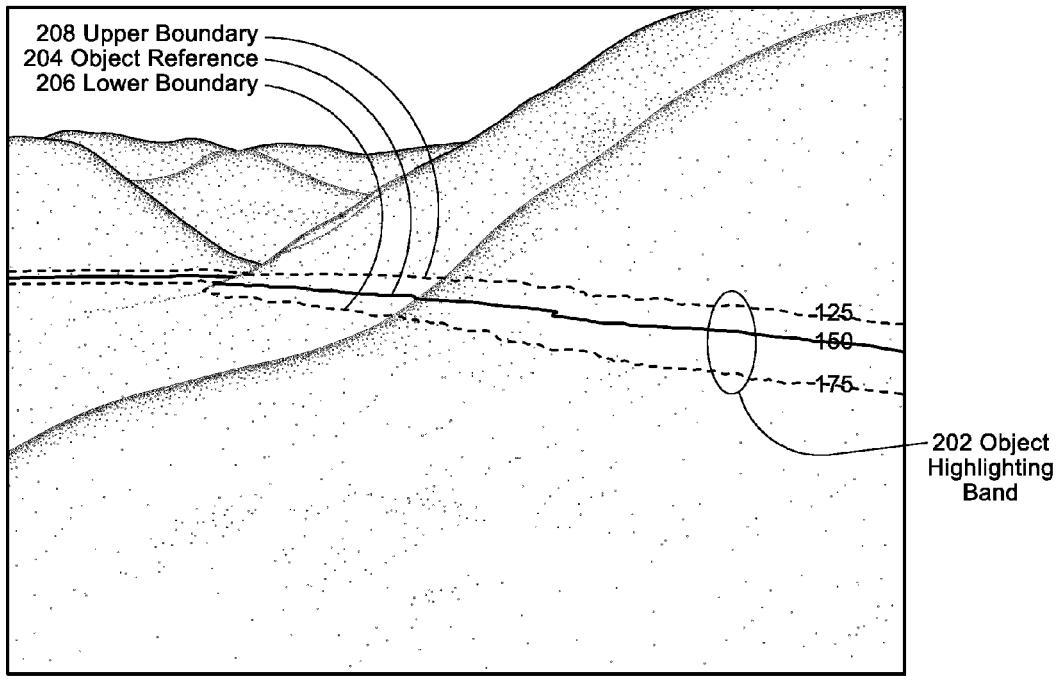
FIGS. 3A and 3B present first and second exemplary illustrations of vertically-disposed object highlighting bands.

The advantages and benefits of the embodiments discussed herein may be illustrated by discussing object highlighters disclosed herein. As disclosed in FIGS. 3A through 3E, three-dimensional object highlighting bands may be employed to highlight areas of terrain located outside an aircraft. Referring to FIG. 3A, an object highlighting band 202 comprised of an object reference 204, a lower boundary 206, and an upper boundary 208 is disclosed. Numerical indicators 125, 150, and 175 may correspond to distances of 125, 150, and 175 feet below the aircraft altitude. As embodied herein, the selection of the numerical values may be configurable and/or selectable by the manufacturer and/or end-user; moreover, the use of one or more boundaries may be optional. Given the numerical indications, the object reference 204 may be a line that traces points on the terrain that are 150 feet below the aircraft altitude, the lower boundary 206 may be a line tracing points on the terrain that are 175 feet below, and the upper boundary 208 may be line tracing points the terrain that are 125 feet below.

To distinguish between the object reference 204 and the lower and upper boundaries 206 and 208, the configuration of the object reference may be different from the configuration of the lower and upper boundaries. As shown in FIG. 3A, the configuration of the object reference 204 is comprised of a solid line, whereas the configuration of the visual appearance of the lower and upper boundaries 206 and 208 is comprised of a dashed line.

Figure 3B:
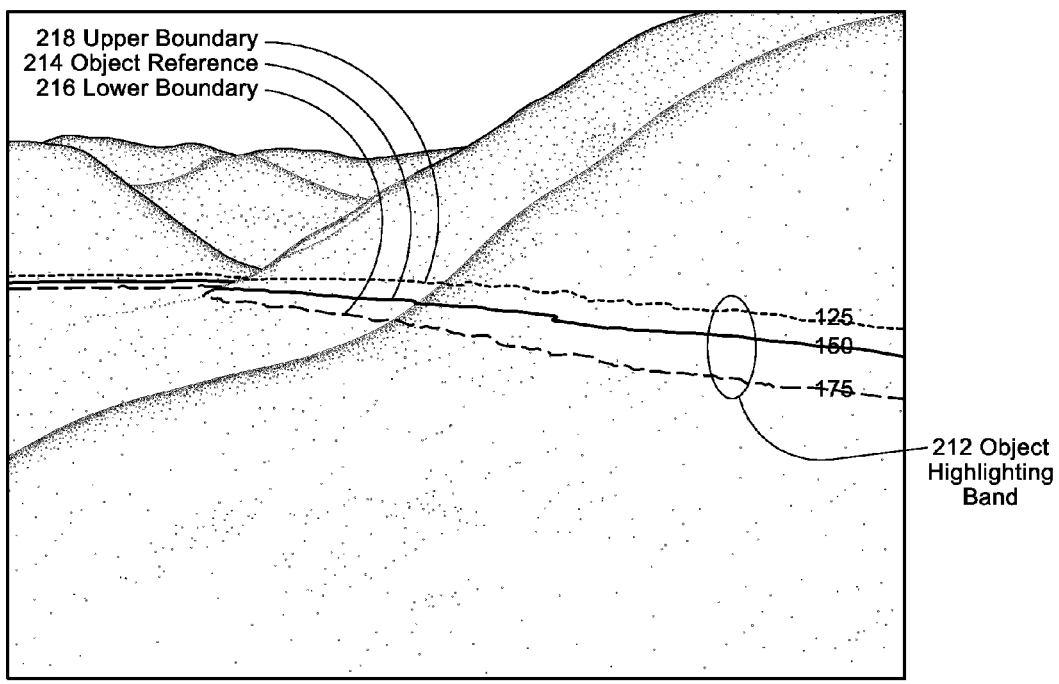

To distinguish between the lower boundary 206 and the upper boundary 208, the configurations of each may differ. Referring to FIG. 3B, an object highlighting band 212 comprised of an object reference 214, a lower boundary 216, and an upper boundary 218 is disclosed. As observed, the lower boundary 214 is comprised of a dashed line having longer dashes than the dashed line of the upper boundary 216. It should be noted that the configurations of an object reference, a lower boundary, and an upper boundary are not limited to the style of line. Alternatively and/or additionally, the visual appearances of one or more lines may be configurable and/or selectable by the manufacturer and/or end-user. For the purpose of illustration and not limitation, one or more of the lines could be configured by varying the thickness and/or color.

Figure 3C:
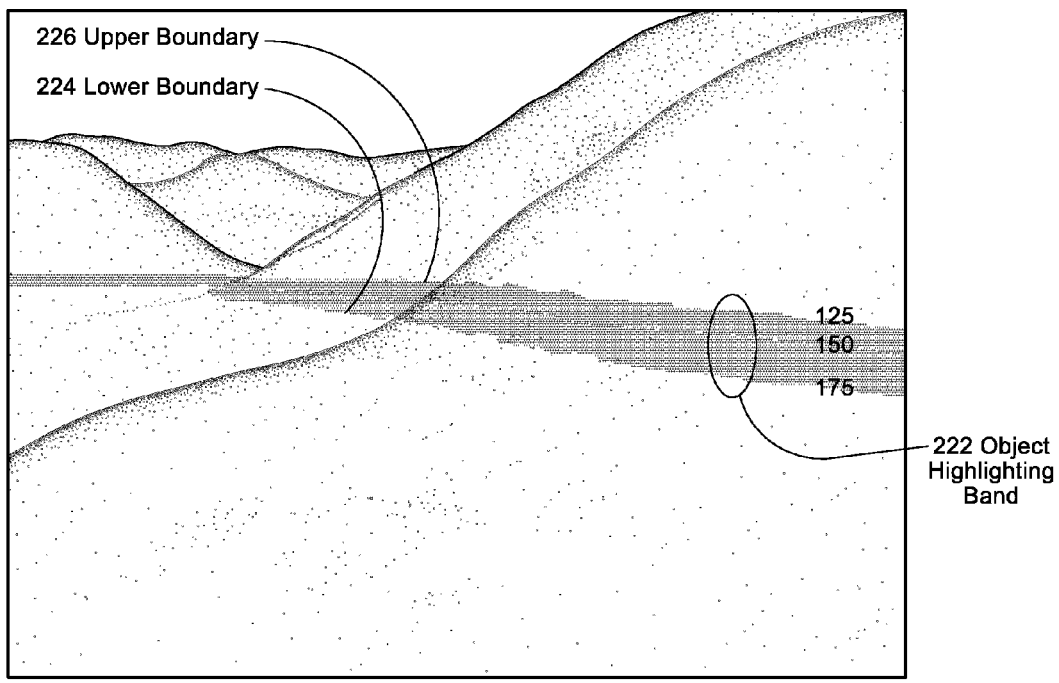
FIGS. 3C and 3D present first and second exemplary illustrations of vertically-disposed object highlighting bands.
Figure 3D:
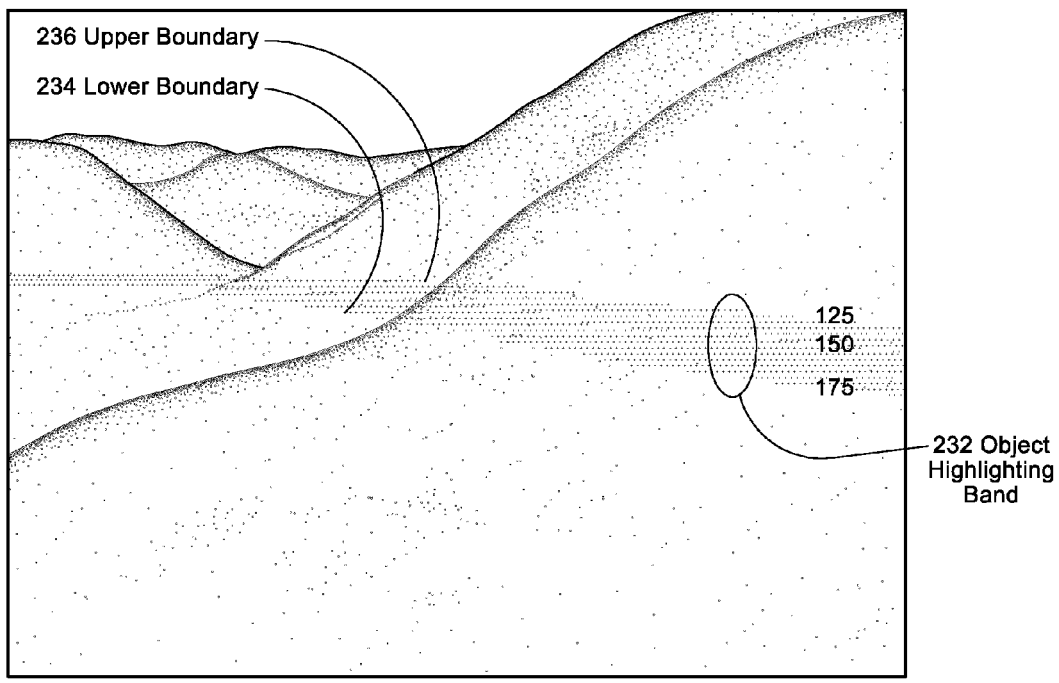

Referring to FIG. 3C, an object highlighting band 222 comprised of an enhancing effect bounded by a lower boundary 224 and an upper boundary 226 is disclosed. Referring to FIG. 3D, an object highlighting band 232 comprised of an enhancing effect bounded by a lower boundary 234 and an upper boundary 236 is disclosed. Object highlighting bands could be configured to display enhancing effects such as, but not limited to, shading, transparency, translucency, opacity, texture-mapping, bump-mapping, fogging, shadowing, patterns, colors, or any combination thereof. As embodied herein, object highlighting bands are similar to location highlighters that have been disclosed by Yum et al in U.S. Pat. No. 8,094,188, a reference incorporated herein in its entirety. Each of these examples discussed herein are intended to provide an example of enhancements which highlight the locations of objects, and are not intended to provide a limitation or an exhaustive list to the embodiments disclosed herein.

As shown in FIG. 3C, the enhancing effect of the object highlighting band 222 may be comprised of a relatively dark shade and/or a color that highlights the area of terrain located outside the aircraft at which the vertical distances between the elevations of terrain and the aircraft altitude are between 125 and 175 feet. By comparison, the object highlighting band 232 of FIG. 3D may be comprised of a relatively light shade and/or a second color highlighting the vertical distances between the elevations of terrain and the aircraft altitude are between 125 and 175 feet.

Figure 3E:
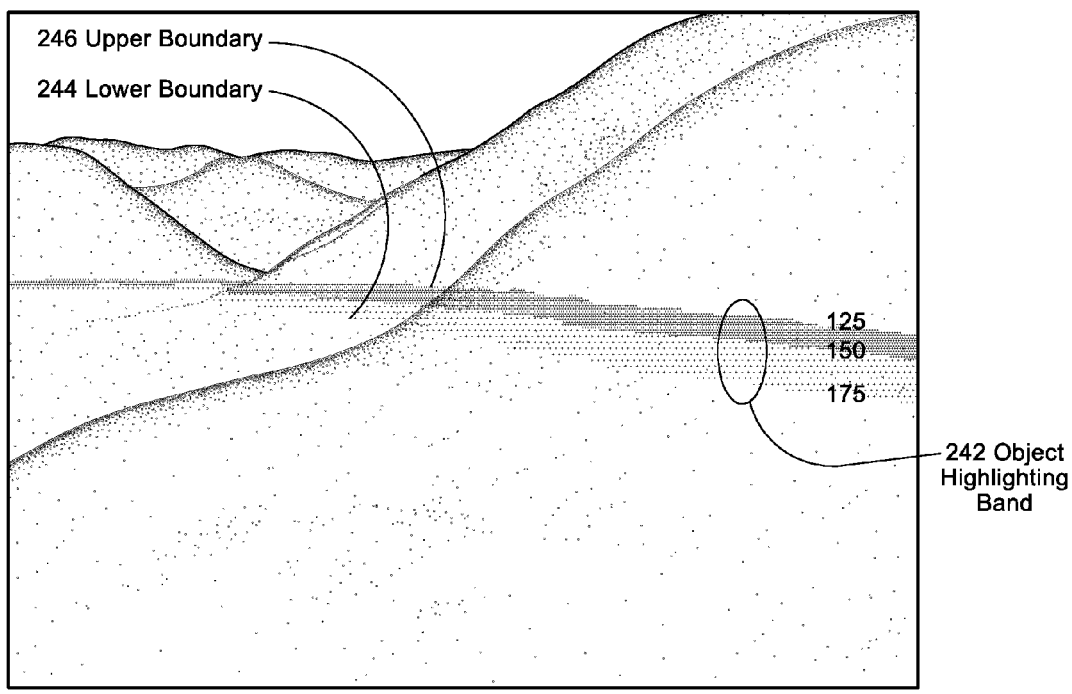
FIG. 3E presents a fifth exemplary illustration of a vertically-disposed object highlighting band.
Figure 4A:
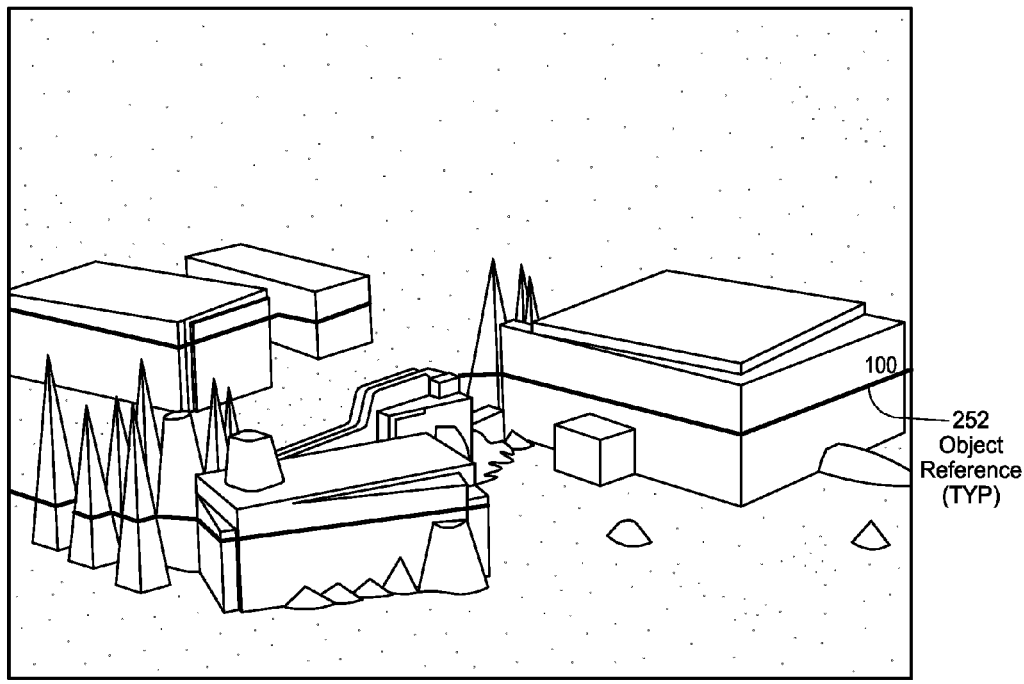
FIGS. 4A and 4B present sixth and seventh exemplary illustrations of vertically-disposed object highlighting bands.

As embodied herein, an object highlighting band may be comprised of a plurality of enhancing effects. Referring to FIG. 3E, an object highlighting band 242 comprised of a plurality of enhancing effects and bounded by a lower boundary 244 and an upper boundary 246 is disclosed. The enhancing effect of the object highlighting band 242 may be comprised of a lighter shade and/or a color highlighting vertical distances between the elevations of terrain and the aircraft altitude are between 125 and 150 feet and a darker shade and/or a second color highlighting vertical distances between the elevations of terrain and the aircraft altitude are between 150 and 175 feet In addition to highlighting areas of terrain, areas of obstacles (e.g., structures) may be highlighted additionally to and/or alternatively. As disclosed in FIGS. 4A through 4D, object highlighting bands may be employed to highlight areas of obstacles located outside an aircraft. Referring to FIG. 4A, an object reference 252 is disclosed, and the numerical indicator of 100 may correspond to a distance of 100 feet below the aircraft altitude. Given the numerical indication, the object reference 252 may be a line that traces points on the structures that are 100 feet below the aircraft altitude.

Figure 4B:
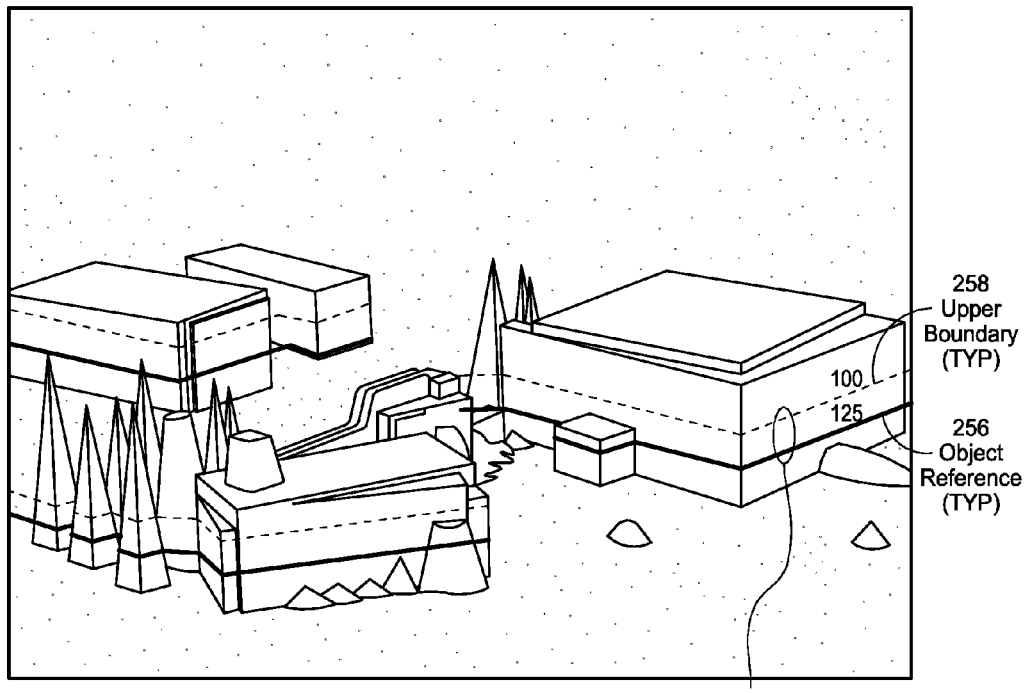

Referring to FIG. 4B, an object highlighting band 254 comprised of an object reference 256 and an upper boundary 258 is disclosed. In this example, the manufacturer and/or end-user has configured an objecting highlighting with one boundary. Furthermore, as compared with the object reference 252 of FIG. 4A, the distance of the object reference 256 has been configured now for 125 feet, demonstrating the configurable and/or selectable nature of one or more distances.

Figure 4C:
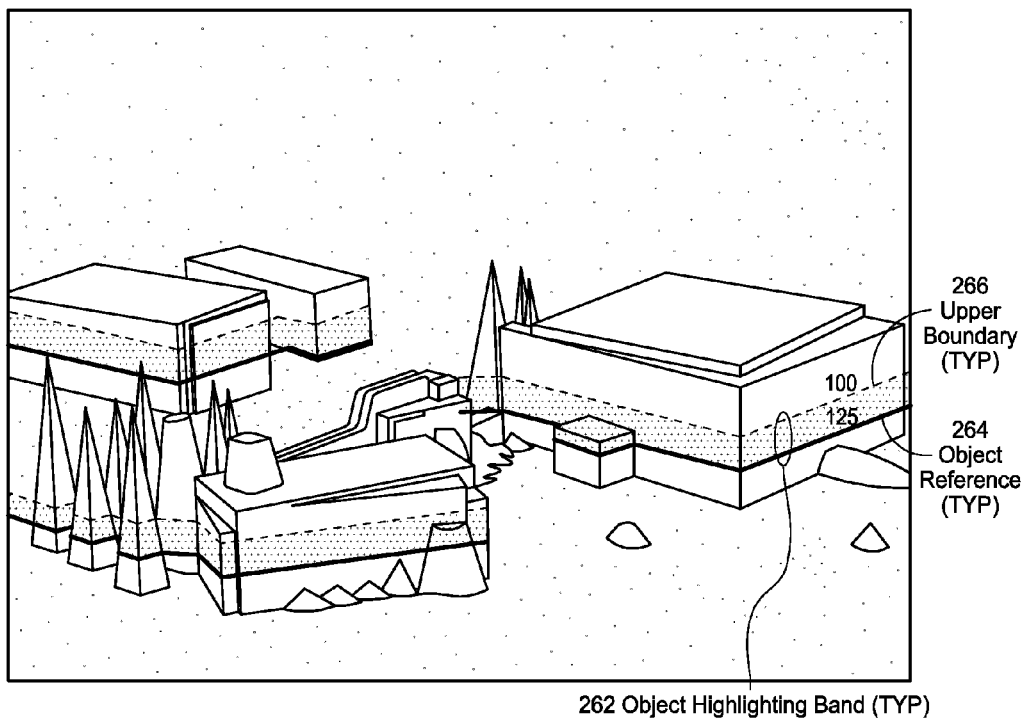
FIGS. 4C and 4D present eighth and ninth exemplary illustrations of vertically-disposed object highlighting bands.

As shown in FIG. 4C, the enhancing effect of the object highlighting band 262 in between an object reference 264 and an upper boundary 266 may be comprised of a shade and/or a color that highlights the area of obstacles located outside the aircraft at which the vertical distances between the elevations of points on the obstacles and the aircraft altitude are between 100 and 125 feet. It should be noted that the display of an object reference and/or one or more boundaries at the same time as an enhancing effect may be configurable and/or selectable by a manufacturer and/or end-user.

Figure 4D:
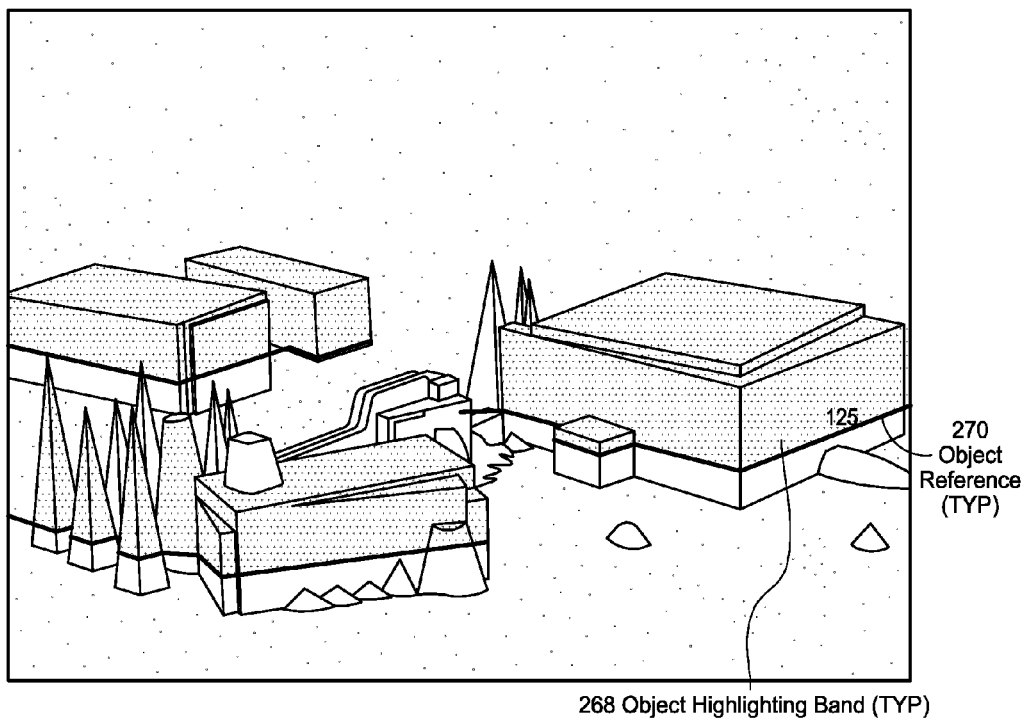

As shown in FIG. 4D, the enhancing effect of the object highlighting band 268 above an object reference 270 may be comprised of a shade and/or a color that highlights the area of obstacles at which the vertical distances between the elevations of points on the obstacles and the aircraft altitude are less than and/or equal to 125 feet. Here, an upper boundary could have been selected at a value which resulted in those areas of the structures above the object reference 270. Additionally and/or alternatively, a manufacturer and/or end-user could configure the upper boundary as the height of one or more objects.

Figure 5A:
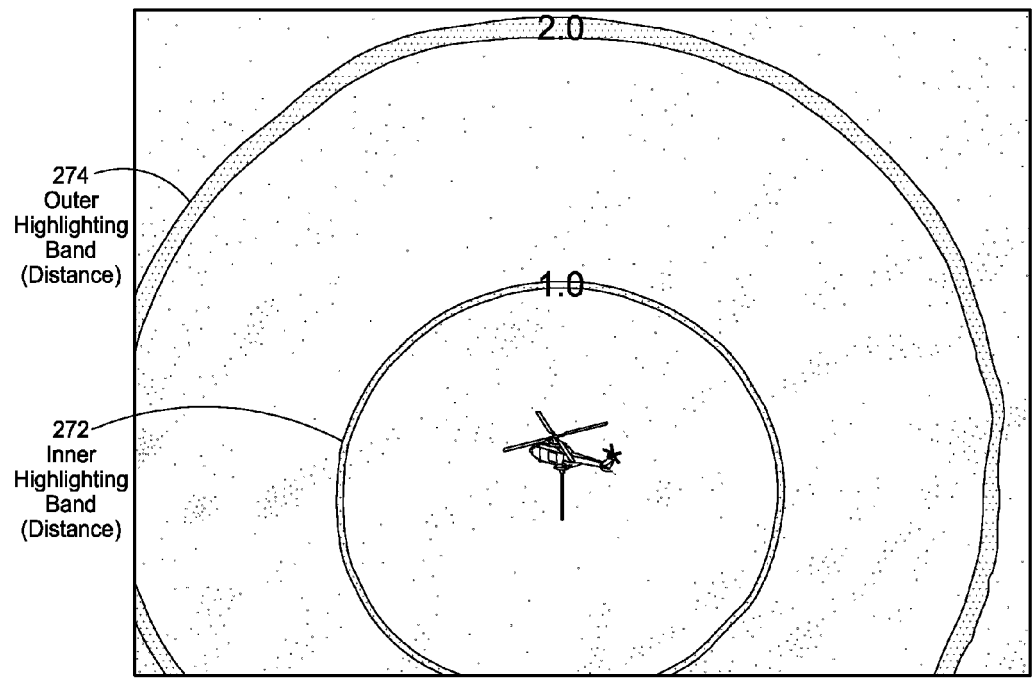
FIGS. 5A and 5B present first and second exemplary illustrations of horizontally-disposed object highlighting bands.

As demonstrated above, a vertically-disposed object highlighting band may be applied to highlight objects that are referenced vertically to the aircraft. The embodiments disclosed herein apply not only to vertically-disposed object highlighting bands but also horizontally-disposed object highlighting bands; that is, horizontally-disposed object highlighting bands may be applied to objects that are referenced horizontally to the aircraft. Referring to FIG. 5A, an image of an exocentric scene located outside an aircraft (as shown, a helicopter) is shown with a plurality of highlighting bands. An inner highlighting band 272 and an outer highlighting band 274 comprised of enhancing effects are disclosed. As shown by the numerical indications, the inner highlighting band 272 and outer highlighting band 274 are bands located 1.0 and 2.0 nautical miles ("NM"), respectively, from the aircraft; although not illustrated, object references could be the distances defining the bands. As shown, the configuration of the outer highlight band 274 is wider than the inner highlight band 272 as may be selected by a manufacturer and/or end-user.

Figure 5B:
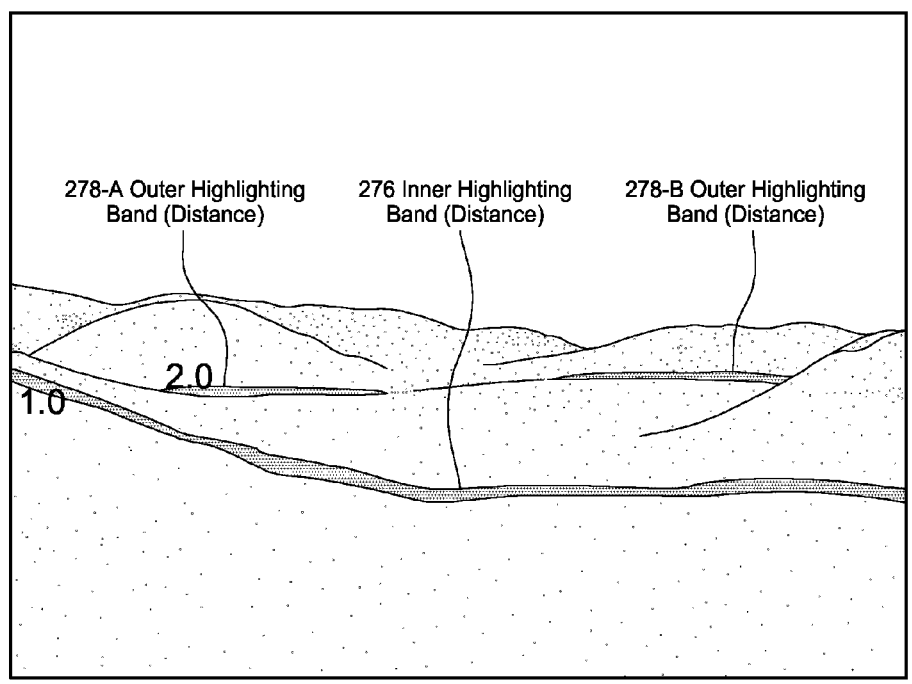

Referring to FIG. 5B, an image of an egocentric scene located outside an aircraft is shown with a plurality of highlighting bands; for the purpose of discussion only, the plurality of highlighting bands will share the same configuration of FIG. 5A. As shown in FIG. 5B, an inner highlighting band 276 and an outer highlighting band 278 comprised of the same enhancing effects of FIG. 5A are disclosed; as observed, part of the outer highlighting band 278 has been occluded by a small rise of terrain. Because the outer highlighting band 278 (located 2.0 NM from the aircraft) is wider than the inner highlighting band 276 (located 1.0 NM from the aircraft), the outer highlighting band 278 is more easily seen by the viewer although it is located further away; although not illustrated, object references could be the distances defining the bands.

Figure 5C:
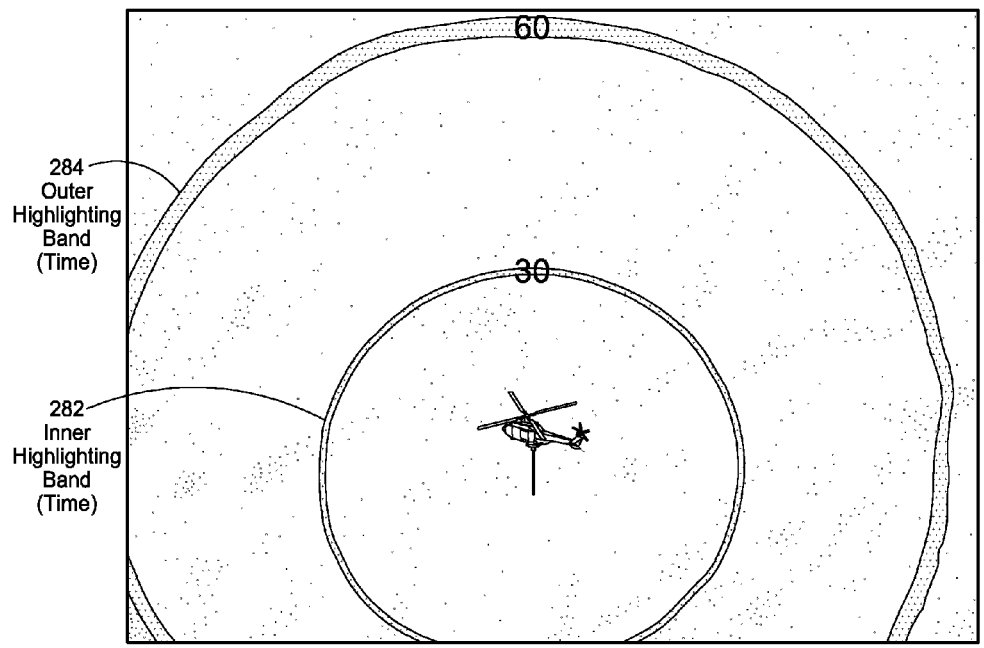
FIGS. 5C and 5D present first and second exemplary illustrations of horizontally-disposed object highlighting bands.

Referring to FIG. 5C, an image of an exocentric scene located outside an aircraft is shown with a plurality of highlighting bands. An inner highlighting band 282 and an outer highlighting band 284 comprised of enhancing effects are disclosed. Instead of a horizontal reference of distance, a horizontal reference of time may be employed. As shown by the numerical indications, the inner highlighting band 282 and outer highlighting band 284 are bands located 30 and 60 seconds, respectively, from the aircraft; although not illustrated, object references could be the times defining the bands. Similar to the highlighting bands of FIG. 5A, the configuration of the outer highlight band 284 of FIG. 5C is wider than the inner highlight band 282.

Figure 5D:
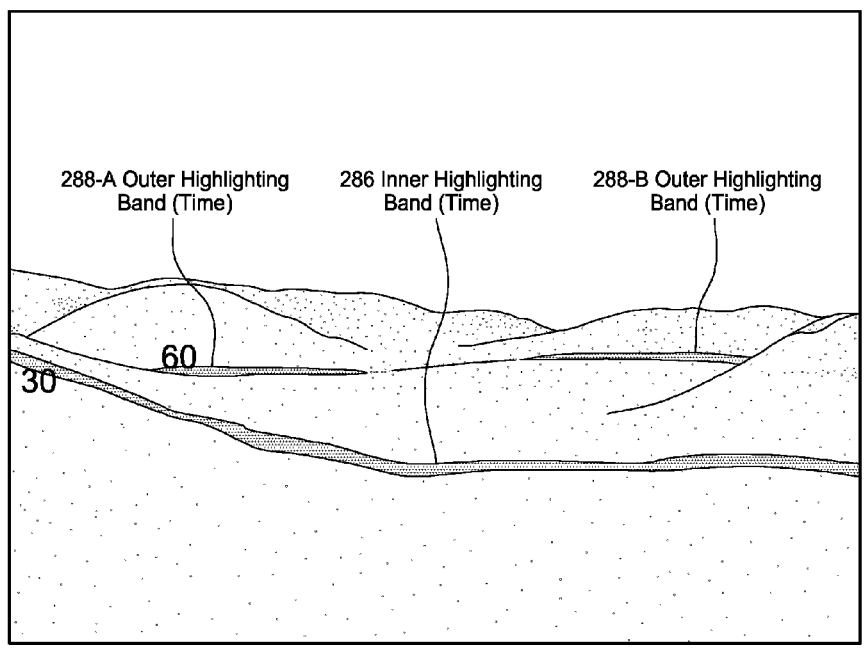

Referring to FIG. 5D, an image of an egocentric scene located outside an aircraft is shown with a plurality of highlighting bands; for the purpose of discussion only, the plurality of highlighting bands will share the same configuration of FIG. 5C. As shown in FIG. 5D, an inner highlighting band 286 and an outer highlighting band 288 comprised of the same enhancing effects of FIG. 5B are disclosed; as observed, part of the outer highlighting band 288 has been occluded by a small rise of terrain. Because the outer highlighting band 288 (located 60 seconds from the aircraft) is wider than the inner highlighting band 286 (located 30 seconds from the aircraft), the outer highlighting band 288 is more easily seen by the viewer although it is located further away; although not illustrated, object references could be the times defining the bands.

Figure 6:
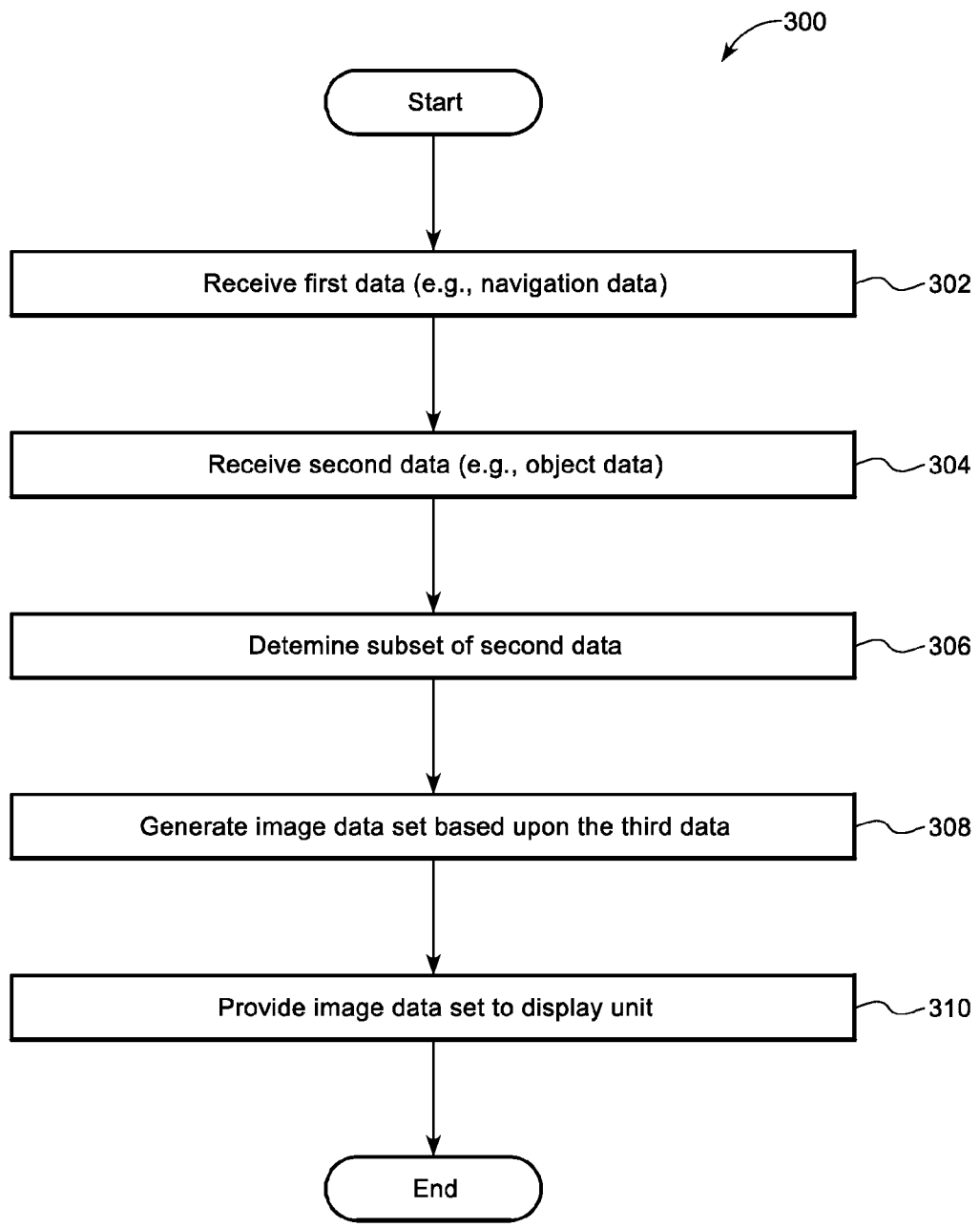
FIG. 6 provides a flowchart illustrating a method for generating surface information presentable on a display unit.

FIG. 6 depicts flowchart 300 disclosing an example of a method for generating and/or presenting surface information on a display unit, where the IG 130 may be programmed or configured with instructions corresponding to the following modules embodied in the flowchart. Also, the IG 130 may be a processor of a physical or tangible module such as, but not limited to, a printed circuit board having one or more input interfaces to facilitate the two-way data communications of the IG 130, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

The flowchart begins with module 302 with the receiving of first data. The first data could be received from the navigation data source 110 and comprised of navigation data representative of at least position and direction of an aircraft, where position could be comprised of latitude, longitude, and/or altitude (or elevation when on the surface) information, and sequential aircraft positional information could be used to determine aircraft speed and/or aircraft ground track.

The flowchart continues with module 304 with the retrieving of second data. Based upon the navigation data, the second data could be retrieved from the object data source 120 and comprised of object data representative of a plurality of predefined vertical measurements (e.g., elevations, heights, etc. . . . , known before a flight) and/or location of objects located outside the aircraft; as embodied herein, an object may be comprised of a terrain cell and/or obstacle having a predefined position. Where the object highlighting band is horizontally-disposed, the retrieval of second data could be limited to objects and/or object cells located within the object highlighting band, the location of which may be defined, in part, a distance or time from the aircraft (which could be determined as a function of speed).

The flowchart continues with an optional module 306 with the determining of a subset of second data based upon object highlighting band criteria, where the subset could be comprised of the second data representative of one or more objects, if any, meeting the object highlighting band criteria; the subset of second data could include all of the second data. As embodied herein, the object highlighting band criteria could be comprised of a configurable and/or selectable object reference and/or one or more boundaries.

Where the object highlighting band is vertically-disposed, the object reference may be a vertical distance referenced to aircraft position, and each boundary may be located to one side of the object reference at a defined distance; for example, the object reference may be a vertical distance below or above the altitude of an aircraft. In the determination of the subset, the predefined vertical measurement of each object represented in the second data (i.e., object data) may be compared with the altitude of the aircraft, and if the difference between the predefined vertical measurement and the altitude meets the object highlighting band criteria, the object may be considered part of the subset. Where the object highlighting band is horizontally-disposed, the object reference may be a horizontal distance or time referenced to aircraft position.

The flowchart continues with module 308 with the generating of an image data set based upon second data, where the image data set may be representative of an image comprised of one or more three-dimensional object highlighting bands configured to highlight one or more objects represented in the second data, where each object highlighting band provides a three-dimensional visual appearance; if a subset of the second data has been determined, then the second data used in the generating of the second data could be comprised of the subset of the second data.

As embodied herein, the object highlighting band may be comprised of a vertically-disposed highlighting band and/or a horizontally-disposed highlighting band. In one embodiment, a vertically-disposed highlighting band could be comprised of at least an object reference line and one or more boundaries. In another embodiment, a vertically-disposed highlighting band and/or a horizontally-disposed highlighting band could be comprised of one or more enhancing effects. In an additional embodiment, the image could be further comprised of an image of a three-dimensional scene located outside the aircraft.

The flowchart continues with an optional module 310 with the providing of the image data set to one or more displays configured to receive the image data set. After being received, the image of one or more object highlighting bands represented in the image data set may be presented, drawing the attention of the viewer (e.g., pilot) to the presence of objects located outside of the aircraft meeting highlighting band criteria. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating surface information presentable on at least one display, such system comprising:
    a source of navigation data;
    a source of object data; and
    an image generator configured to:
        receive navigation data representative of at least aircraft geographic position, altitude, and heading;
        retrieve object data based upon at least the aircraft geographic position, where
            the object data is representative of a plurality of predefined elevations and geographic locations of at least one of terrain and stationary, manmade structures located outside an aircraft; and
        generate an image data set based upon the navigation data, the object data, and object highlighting band criteria, where
            the image data set is representative of a visible image comprised of at least one object highlighting band presented against a visible image of a three-dimensional scene located outside the aircraft, where
                at least one of the terrain and stationary, manmade structures located within an object highlighting band is visually highlighted by at least one enhancing effect.

2. The system of claim 1, wherein
the object highlighting band criteria is comprised of an object reference, and
at least one object highlighting band is horizontally-disposed, where
    the object reference is a horizontal measurement of distance or time referenced to the aircraft position, and
    the retrieval of the object data is further based upon the horizontal measurement of distance or time.

3. The system of claim 1, wherein
an image generator is further configured to:
    determine a subset of the object data based upon the object highlighting band criteria, such that
        the object data upon which the generation of the image data set is based is the subset.

4. The system of claim 3, wherein
the object highlighting band criteria is comprised of an object reference, and
at least one object highlighting band is vertically-disposed, where
    the object reference is a vertical measurement referenced to the aircraft position.

5. The system of claim 3, wherein
the object highlighting band criteria is comprised of an object reference, and
at least one object highlighting band is horizontally-disposed, where
    the object reference is a horizontal measurement of distance or time referenced to the aircraft position.

6. The system of claim 1, wherein the three-dimensional scene located outside the aircraft is presented egocentrically or exocentrically.

7. The system of claim 1, further comprising:
    at least one display configured to:
        receive the image data set from the image generator, and
        present the image represented in the image data set on each display, thereby
            drawing the attention of the viewer to the presence of at least one of the terrain and stationary, manmade structures located within the visually highlighted object highlighting band.

8. A device for generating surface information presentable on at least one display, such device comprising:
    an image generator configured to:
        receive navigation data representative of at least aircraft geographic position, altitude, and heading;
        retrieve object data based upon at least the aircraft geographic position, where
            the object data is representative of a plurality of predefined elevations and geographic locations of at least one of terrain and stationary, manmade structures located outside an aircraft; and
        generate an image data set based upon the navigation data, the object data, and object highlighting band criteria, where
            the image data set is representative of a visible image comprised of at least one object highlighting band presented against a visible image of a three-dimensional scene located outside the aircraft, where
                at least one of the terrain and stationary, manmade structures located within an object highlighting band is visually highlighted by at least one enhancing effect.

9. The device of claim 8, wherein
the object highlighting band criteria is comprised of an object reference, and
at least one object highlighting band is horizontally-disposed, where
    the object reference is a horizontal measurement of distance or time referenced to the aircraft position, and
    the retrieval of the object data is further based upon the horizontal measurement of distance or time.

10. The device of claim 8, wherein
an image generator is further configured to:
    determine a subset of the object data based upon the object highlighting band criteria, such that
        the object data upon which the generation of the image data set is based is the subset.

11. The device of claim 10, wherein
the object highlighting band criteria is comprised of an object reference, and
at least one object highlighting band is vertically-disposed, where
    the object reference is a vertical measurement referenced to the aircraft position.

12. The device of claim 10, wherein
the object highlighting band criteria is comprised of an object reference, and
at least one object highlighting band is horizontally-disposed, where
    the object reference is a horizontal measurement of distance or time referenced to the aircraft position.

13. The device of claim 8, wherein the three-dimensional scene located outside the aircraft is presented egocentrically or exocentrically.

14. The device of claim 8, wherein
the image generator is further configured to:
  provide the image data set to at least one display, whereby
    the image represented in the image data set is presented on each display, thereby
      drawing the attention of the viewer to the presence of at least one of the terrain and stationary, manmade structures located within the visually highlighted object highlighting band.

15. A method for generating surface information presentable on at least one display, such method comprising:
receiving navigation data representative of at least aircraft geographic position, altitude, and heading;
retrieving object data based upon at least the aircraft geographic position, where
  the object data is representative of a plurality of pre-defined elevations and geographic locations of at least one of terrain and stationary, manmade structures located outside an aircraft; and
generating an image data set based upon the navigation data, the object data, and object highlighting band criteria, where
  the image data set is representative of a visible image comprised of at least one object highlighting band presented against a visible image of a three-dimensional scene located outside the aircraft, where
    at least one of the terrain and stationary, manmade structures located within an object highlighting band is visually highlighted by at least one enhancing effect.

16. The method of claim 15, wherein
the object highlighting band criteria is comprised of an object reference, and
at least one object highlighting band is horizontally-disposed, where
  the object reference is a horizontal measurement of distance or time referenced to the aircraft position, and
the retrieval of the object data is further based upon the horizontal measurement of distance or time.

17. The method of claim 15, further comprising:
determining a subset of the object data based upon the object highlighting band criteria, such that
  the object data upon which the generation of the image data set is based is the subset.

18. The method of claim 17, wherein
the object highlighting band criteria is comprised of an object reference, and
at least one object highlighting band is vertically-disposed, where
  the object reference is a vertical measurement referenced to the aircraft position.

19. The method of claim 17, wherein
the object highlighting band criteria is comprised of an object reference, and
at least one object highlighting band is horizontally-disposed, where
  the object reference is a horizontal measurement of distance or time referenced to the aircraft position.

20. The method of claim 15, further comprising:
providing the image data set to at least one display, whereby
  the image represented in the image data set is presented on each display, thereby
    drawing the attention of a the viewer to the presence of at least one of the terrain and stationary, manmade structures located within the visually highlighted object highlighting band.

\* \* \* \* \*